United States Patent Office 3,162,639
Patented Dec. 22, 1964

3,162,639
6-DESOXY-14-HYDROXY-DIHYDROMORPHINE DERIVATIVES
Jack Fishman, Forest Hills, N.Y., assignor to Mozes Juda Lewenstein, Kew Gardens, N.Y.
No Drawing. Filed Jan. 13, 1960, Ser. No. 2,121
7 Claims. (Cl. 260—285)

This invention relates to new morphine derivatives and it has particular relation to new compounds derived from 14-hydroxymorphinone.

14-hydroxymorphinone, which has been known from U.S. Patent No. 2,772,270 issued November 27, 1956, has been found to be rather toxic and cannot be utilized for therapeutic applications due to its toxicity.

In further development of 14-hydroxymorphinone chemistry new derivatives have now been obtained which have been found to possess valuable therapeutic properties with a low incidence of side effects and which are effective in very small doses. In addition it has been found completely unexpectedly that these new substances suppress abstinence of morphine addicted monkeys at higher levels of their effective doses than is customary with other opium derivatives or synthetic analgesics.

New compounds embodying the present invention correspond to the general structural formula

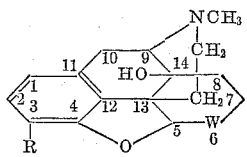

wherein R stands for the radical —OCH$_3$—OCH$_2$OCH$_3$ or —OH and W stands for >C=CH$_2$ or >CH—CH$_3$.

Generally, codeine-like compounds are weak analgesics and have to be used in considerably larger doses than morphine. Products of the present invention have been found, however, to form an exception. Thus, 6-methylene-6-desoxy-14-hydroxydihydro-codeine acts in small doses and is at least as effective as morphine. It nevertheless has the same duration of effect as morphine, although usually an increase in analgesic activity in the codeine and morphine series is accompanied by a decrease of duration of effect. 6-methylene-6-desoxy-14-hydroxydihydromorphine is much more potent. There is usually a ratio of 1:6 between the analgesic potency of a codeine compound and the corresponding morphine compound. In the case of 6-methylene-6-desoxy-14-hydroxydihydromorphine, the spread is more than 1:10. Changing the starting material to this morphine derivative, produced a compound which quite unexpectedly has been found to have an analgesic potency of 20 times that of morphine when injected subcutaneously.

Usually the increase in potency maintains or increases the addiction liabilities of narcotic compounds. In the case of the compounds of this invention, the addiction liabilities are of a much milder nature than those of morphine.

The following examples describe some specific embodiments of, and a best mode for, carrying out the invention, to which the invention is not limited.

*Example 1*

Thirty grams of 14-hydroxymorphinone were converted to its sodium salt, and suspended in 200 cc. of chloroform. Eight grams of chloromethyl ether in 50 cc. of chloroform were added and the mixture was stirred under nitrogen for 10 hours. The solution was then washed with dilute NaOH and water and dried and evaporated. The 14-hydroxymethoxymethylmorphinone thus obtained was crystallized from benzene-hexane.

Ten grams of 14-hydroxymethoxymethylmorphinone was hydrogenated in 100 ml. of 10% acetic acid over 1 g. of palladium on charcoal. After the take up of 1.2 mol equivalents of hydrogen, the mixture was filtered, diluted with 500 ml. of water and the pH adjusted to 10 with ammonium hydroxide. After extracting 3 times with 150 ml. of chloroform, the combined organic layers were washed with water and dried and evaporated, to recover the 14-hydroxymethoxymethyldihydromorphinone which was crystallized from benzene-petroleum ether.

10 grams of 14-hydroxymethoxymethyldihydromorphinone dissolved in the minimum amount of purified tetrahydrofuran was added slowly to a stirred solution of four equivalents of triphenylphosphomethylene reagent in ethyl ether. The ether was fractionally distilled off, with periodic additions of pure tetrahydrofuran, until the distilling temperature was 60° C. The solution was refluxed at this temperature for 40 hours, after which the solvent was removed on the steam bath under reduced pressure. The residue was taken up in 200 cc. of chloroform and 100 cc. of water. The water layer was discarded and the chloroform was washed once with 100 cc. of 5% NaOH (aq.) and then extracted three times with 100 cc. of 2 N sulfuric acid. The acid extract was quickly neutralized and adjusted to pH 9.0 with concentrated ammonium hydroxide and the basic solution was extracted with four 100 cc. portions of chloroform. The ketonic materials were removed from the organic layer by washing with a sodium bisulfite-sodium sulfite solution, and the chloroform was dried over sodium sulfate and evaporated. The residue was crystallized from ethanol to give 2.4 grams of 6-methylene-6-desoxy - 14 - hydroxymethoxymethyldihydromorphine.

One gram of 6-methylene-6-desoxy-14-hydroxymethoxymethyldihydromorphine was allowed to stand for four hours at room temperature in 20 ml. of 1 N HCl. After dilution with 80 ml. of water the pH was adjusted to 9 with ammonium hydroxide and the mixture was extracted with chloroform (3 x 100 ml.), which was dried and evaporated. After sublimation and crystallization from methanol, 6-methylene-6-desoxy-14-hydroxydihydromorphine was obtained with a melting point of 220°–225° C.

*Example 2*

One gram of 6-methylene 6-desoxy-14-hydroxydihydromorphine was dissolved in 50 ml. of ethanol and treated with an excess of diazomethane in ether. After standing for 48 hours at room temperature the solvents were evaporated and the residue was crystallized from ethanol to give 6-methylene-6-desoxy-14-hydroxydihydrocodeine with a melting point of 152°–154° C.

*Example 3*

One gram of 6-methylene-6-desoxy-14-hydroxydihydromorphine was stirred under hydrogen in 30 cc. of glacial acetic acid which contained 0.3 ml. of concentrated HCl, over 30 mg. of PtO$_2$. After 24 hours the mixture was filtered, diluted with 100 cc. of water and the pH adjusted to 9.0 with ammonium hydroxide. Extraction with 3 x 50 ml. of chloroform which was dried and evaporated, gave 6-methyl-6-desoxy - 14 - hydroxydihydromorphine which was purified by alumina chromatography and crystallization. Melting point, 218°–220° C.

*Example 4*

One gram of 6-methylene-6-desoxy-14-hydroxydihydrocodeine was hydrogenated by the procedure described in the above Example 3. Melting point, 160°–162° C.

The same product is obtained by diazomethane methylation in ethanol of 6-methyl-6-desoxy-14-hydroxydihydromorphine.

Example 5

100 mg. of 6-methylene-6-desoxy-14-hydroxydihydrocodeine were dissolved in 20 cc. of dilute ethanol. Excess dilute hydrochloric acid (10 cc.) was added, and the mixture was evaporated to dryness under reduced pressure on a steam bath. The white hydrochloride salt was crystallized from ethanol-ether.

Example 6

100 mg. of 6-methylene-6-desoxy-14-hydroxydihydrocodeine was dissolved in 20 ml. of ethanol. A solution of 39 mg. of benzoic acid in 5 cc. of ethanol was added and the solvent was evaporated under reduced pressure on a steam bath. The white benzoate was crystallized from ethanol-ether.

It has been found that a wide variety of salts of the compounds embodying the present invention can be prepared. They include hydrochloride, hydrobromide, neutral and acid sulfate, phosphates, nitrate, acetate, benzoate, salicylate, neutral and acid fumarate and malate, terephthalate, ethanesulfonate, the bitartrate and others.

Water-soluble salts with volatile acids (e.g., hydrochloric and acetic acid) can be prepared by adding an aqueous solution of slightly more than one equivalent of the acid to an aqueous dispersion of the base and evaporating the solution thus formed under reduced pressure. The residue can then be recrystallized. Salts of nonvolatile inorganic acids (e.g., orthophosphoric acid) can be prepared by adding the stoichiometric amount of the acid to an aqueous dispersion of the base and treating the resulting solution in the manner described above. Salts of organic acids which are difficultly soluble in water (e.g., the benzoate) can be prepared by reacting the acid and the base in equivalent amounts in ethyl alcoholic medium and evaporating the solution.

The new compounds of this invention, as well as their salts are useful as narcotic, analgesic and sedative agents and can be administered, e.g., per os, or by subcutaneous, intramuscular or intravenous injection.

In the above Example 1, instead of the sodium salt of 14-hydroxymorphinone other salts, such as alkali salts, e.g., the potassium salt, or other salts of 14-hydroxymorphinone can be used.

It will be understood that this invention is not limited to the steps, materials, conditions and other details specifically described above and can be carried out with various modifications without departing from the scope of the invention as defined in the appended claims.

What is claimed is:

1. A morphine derivative selected from the group consisting of 6-methylene-6-desoxy-14-hydroxydihydromorphine; 6-methylene-6-desoxy-14-hydroxydihydrocodeine; 6-methylene - 6 - desoxy - 14 - hydroxy - methoxymethyldihydromorphine; 6-methyl-6-desoxy-14-hydroxydihydromorphine; 6-methyl-6-desoxy-14-hydroxydihydrocodeine; and salts of these morphine derivatives with a therapeutically applicable acid.

2. The compound 6-methylene-6-desoxy-14-hydroxydihydromorphine.

3. The compound 6-methylene-6-desoxy-14-hydroxydihydrocodeine.

4. The compound 6-methylene-6-desoxy-14-hydroxymethoxymethyldihydromorphine.

5. The compound 6-methyl-6-desoxy-14-hydroxydihydromorphine.

6. The compound 6-methyl-6-desoxy-14-hydroxydihydrocodeine.

7. A process for preparing 6-methylene-6-desoxy-14-hydroxydihydromorphine comprising the treatment of a salt of 14-hydroxymorphinone with chloromethylether, contacting the obtained hydroxymethoxymethylmorphinone with hydrogen in the presence of a hydrogenation catalyst, and contacting the 14-hydroxymethoxymethyldihydromorphinone with triphenylphosphomethylene in a liquid reaction medium, and treating the obtained 6-methylene - 6 - desoxy-14-hydroxymethoxymethyldihydromorphine with an acid solution.

References Cited in the file of this patent
UNITED STATES PATENTS 2,806,033     Lewenstein et al.     Sept. 10, 1957

OTHER REFERENCES

Chadha et al.: J. American Chemical Society, vol. 79, pp. 5730–5734 (1957).

Okun et al.: Journal of Pharmacology and Experimental Therapeutics, vol. 124, No. 3, pp. 255–259 (1958).